Nov. 6, 1928.
W. SCHAFFER
1,690,704
MODULATION INDICATING ARRANGEMENT
Filed Feb. 24, 1925
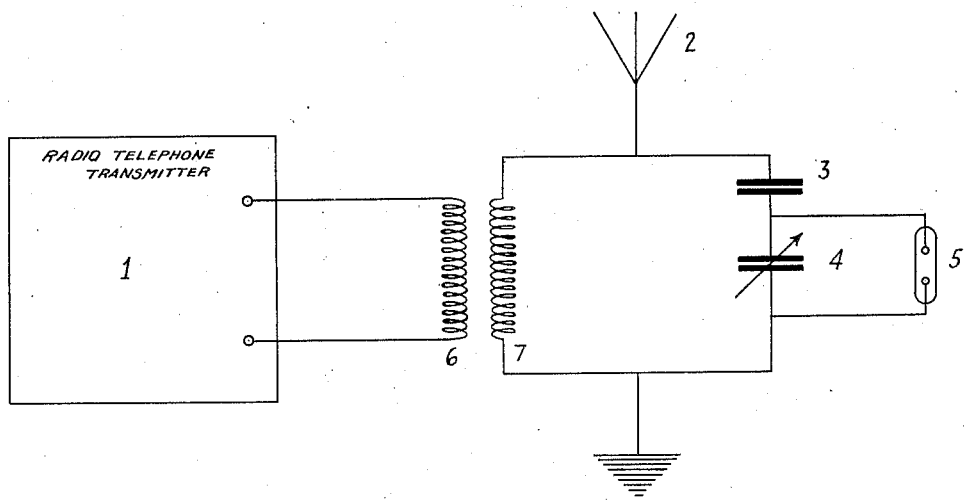
INVENTOR
WALTER SCHAFFER
BY
ATTORNEY Patented Nov. 6, 1928.

1,690,704

UNITED STATES PATENT OFFICE.

WALTER SCHAFFER, OF BERLIN, GERMANY, ASSIGNOR TO GESELLSCHAFT FUR DRAHTLOSE TELEGRAPHIE M. B. H. HALLESCHES, OF BERLIN, GERMANY.

MODULATION-INDICATING ARRANGEMENT.

Application filed February 24, 1925, Serial No. 11,021, and in Germany March 15, 1924.

My invention relates to an arrangement for indicating whether or not a radio frequency transmitter is properly modulated and has for its object to provide such an arrangement which will be simple and yet efficient and accurate in operation.

Other objects will be apparent from the following specification and claims when considered with the accompanying drawing in which the single figure is a circuit embodying the principles of my invention.

This modulation indicator has in the present instance been embodied in a radio telephone transmitter. In such transmitters, on the one hand, there exists the danger of overmodulation whereby distortions of speech are caused, while, on the other hand, there exists the danger of under-modulation whereby their sound intensity is caused to drop. It is therefore necessary to use an indicator device by the indications of which the said two phenomena can be gauged.

A telephony transmitter works free from distortion as long as the aerial current is proportional to the controlling energy. For instance, if during operation the lowest current in the antenna circuit is 1 ampere and the "marking current" or maximum current is 10 amperes, this does not necessarily mean that the antenna current varies between 1 and 10 amperes as a function of the controlling energy in conformity with a straight line. Indeed, in the usual case the changes in antenna current with respect to controlling energy, are linear only inside a certain narrower range, say between 1½ and 9 amperes.

Now, the indicator device, on the one hand, is intended to indicate whenever the controlling energy becomes so large that the antenna current at any given time rises somewhat above 9 amperes, while, on the other hand, the same shall further indicate whether the transmitter actually varies at the maximum controlling power available, that is, in the case illustrated, between 1½ and 9 amperes. Of course, measuring instruments that might be inserted are too sluggish, as by these the instantaneous values occurring at the low controlling frequencies can not be read. However, if in lieu of a current measuring method a "glow-discharge tube is used as the voltage standard for the object of determining crest values according to Palm" (see Zeitschrift fur technische Physik, vol. 4, No. 6, 1923), it is possible by the aid of a suitable connection for this arrangement to realize the desired end.

An arrangement of this sort is shown by way of example in the drawing herewith where 1 denotes a sender of any desired kind upon which control speech current is brought to act. The sender 1 is coupled to antenna 2 thru coupling coils 6 and 7. If the latter be connected with a small condenser 3 in series with a large variable condenser of the rotary kind, 4, and if to this latter a glow-discharge tube 5 is connected in parallel, luminous phenomena will be produced in said tube 5, upon the current in the antenna or the voltage across coil 7 exceeding a certain value. Condenser 4, as stated is of the rotary construction and may be directly calibrated to read in antenna current strength.

During maximum sound intensity in the transmitter, the rotary condenser may be so adjusted that the glow-discharge tube 5 will just flash. From the condenser adjustment there may be obtained then the attained maximum current strength. If the same is too high, for instance, if it has exceeded the part of the characteristic of the transmitter where the change in the antenna current with respect to controlling current is linear, this means that the transmitter is "overcontrolled". Now, if the rotary condenser be just adjusted to the permissible maximum antenna current, the speech energy may be so set that at maximum sound intensity flashing in the tube will just be produced. Modulation greater than that desired as a maximum then will be indicated by a continuous glow instead of an intermittent flash, while modulation less than the desirable maximum will be indicated by no flash at all. The intermittent flash indication, being readily observable, may be termed a unique indication.

By putting smaller speech energies upon the transmitter, it is feasible to check up by the same means to what extent the transmitter is controlled or modulated, by setting the rotary condenser so that flashing of the tube will just be produced at that voltage. The maximum antenna current attained can then be read from the calibration of this rotary condenser.

As before stated, this should preferably not be less than the allowable minimum for a linear relation between the modulation energy and the antenna current. By setting the condenser at this minimum value of antenna current and applying a reduced modulation energy just sufficient to produce flashing the minimum modulation energy for good operation may be determined. With this same condenser setting whenever the modulation energy reaches the lower limit the tube will flash, and when the energy drops below the minimum value the tube will darken.

Having described one embodiment of my invention, I am entitled to all modifications thereof as fall fairly within the spirit and scope of the following claims:—

1. A modulating system comprising a source of carrier energy, means to modulate the carrier energy, an output circuit, a variable impedance coupled thereto having an adjustable setting means, and an indicating means uniquely responsive to an intensity of modulation determined by the adjustment of the setting means.

2. In radio telephony, the method of controlling the intensity of modulation which includes applying such a portion of the potential of the modulated carrier across a glow discharge device as will cause it to flash intermittently only when the intensity of modulation is that desired, and controlling the modulating energy so as to obtain intermittent flashing.

3. In combination, means for generating a carrier wave, means for modulating said carrier wave, a transmission circuit, a substantially aperiodic indication circuit, a modulation indicating luminous discharge tube coupled thereto, and means to vary the closeness of coupling between the tube and the transmission circuit.

4. In combination, means capable of generating a carrier wave of a desired frequency, means for modulating said carrier wave, a transmission circuit, an indicating circuit connected thereto, said indicating circuit having a fixed impedance and a variable impedance in series, a luminous discharge tube connected across said variable impedance, said variable impedance being graduated to read instantaneous values of current in said transmission circuit at the desired frequency when said tube first becomes luminous.

5. In combination, means capable of generating a carrier wave of a desired frequency, means for modulating said carrier wave, a transmission circuit, an indicating circuit connected thereto, said indicating circuit having a fixed condenser and a variable condenser in series, a luminous discharge tube connected across said variable condenser, said variable condenser being graduated to read instantaneous values of current in said transmission circuit at the desired frequency when said tube first becomes luminous.

WALTER SCHAFFER.